(12) United States Patent
Kafka et al.

(10) Patent No.: US 12,680,259 B2
(45) Date of Patent: Jul. 14, 2026

(54) SEALING AND LOCKING VALVE BOX LID

(71) Applicant: Penn-Troy Manufacturing Inc., Troy, PA (US)

(72) Inventors: Michael Kafka, Troy, PA (US); Merle Eiffert, Gillett, PA (US)

(73) Assignee: Penn-Troy Manufacturing Inc., Troy, PA (US)

( * ) Notice: Subject to any disclaimer, the term of this patent is extended or adjusted under 35 U.S.C. 154(b) by 1070 days.

(21) Appl. No.: 17/521,033

(22) Filed: Nov. 8, 2021

(65) Prior Publication Data

US 2023/0146258 A1     May 11, 2023

(51) Int. Cl.
F16K 27/12          (2006.01)
E02D 29/14          (2006.01)
(52) U.S. Cl.
CPC ............ E02D 29/149 (2013.01); F16K 27/12 (2013.01)

(58) Field of Classification Search
CPC ....... E02D 29/149; F16K 27/12; F16K 35/10; F17C 2205/0308
USPC ................... 220/3.8, 232, 234; 137/382, 296
See application file for complete search history.

(56) References Cited

U.S. PATENT DOCUMENTS

| | | | | |
|---|---|---|---|---|
| 2,233,223 A | * | 2/1941 | Patterson | F16L 55/128 220/325 |
| 2011/0084086 A1 | * | 4/2011 | Rost | H02G 9/10 220/729 |

* cited by examiner

*Primary Examiner* — Don M Anderson
*Assistant Examiner* — Elizabeth J Volz
(74) *Attorney, Agent, or Firm* — Saxton & Stump, LLC

(57)          ABSTRACT

A sealable and lockable valve box lid assembly provides a water-tight seal between the valve box and ground surface, is capable of supporting heavy downward loads created by vehicle traffic, and has a low vertical profile that is suitable for shallow valve box installations. The lid assembly may be flush with the ground when in a closed position, allowing overhead vehicle traffic to pass over a flat surface.

17 Claims, 6 Drawing Sheets

SEALING AND LOCKING VALVE BOX LID

BACKGROUND OF THE INVENTION

This invention relates to a lid apparatus for covering and sealing a valve box, and, more particularly, to a flush-mounting lid utilizing a seal element that fits around the outer circumference of a depending side wall of the lid apparatus.

Water lines, sewer lines, and other utilities such as electrical wiring and the like are typically buried under public rights of way, such as streets, alleys, and easements. Access openings are spaced at intervals throughout the system of utility lines. In the case of water utilities, the access openings provide access to shut off valves that allow selectively isolating sections of the pipe in the event of a break or leak in the system. The shut off valves are frequently buried below the street. Access pipes or openings extend upwardly from the buried valves to the surface to provide a passage for a tool or hand to selectively actuate the valve between its on and off positions. A cover assembly having a removable lid has traditionally been used to prevent debris from entering the access pipe.

Referring to FIG. 1, municipalities often bury water a supply main 1 under a public right of way, in this case, a roadway 3. Valve boxes 5 are spaced at intervals throughout the pipe system 100 and can be used to isolate sections of the pipe, for example, a branch line 7 to a fire hydrant 9, in the event of a break or leak in the pipe system 100. Frequently, the supply main 1 will be located under the center of the roadway 3 and the valve box 5 will be located between the supply main 1 and a curb 11. A shutoff valve 13 is positioned within (typically beneath) the valve box 5. An opening at the top of the valve box 5 enables a worker to access the shutoff valve 13 by hand or with a tool from the surface.

When access openings such as the valve box 5 are left uncovered, they tend to accumulate debris and water, and pose a threat to people and vehicles in proximity to the access openings. Traditionally, a simple lid 15 comprising a metal plate sits inside the opening of the valve box 5. This type of lid 15 does not prevent water and fine particles from seeping into the valve box 5 and interfering with the operation and maintenance of the shutoff valve 13. This type of lid 15 is also susceptible to being displaced by vehicular traffic or being stolen by vandals.

Large flat steel plates (not shown) are sometimes used to cover access openings, for example, during construction. These plates are difficult to handle and position, and do not stop dirt, dust and other objects from entering the access opening beneath the steel plates, when the steel plates are not precisely aligned with the top of the access opening. Misaligned steel plates may form a safety hazard for vehicles passing over them, and do not stop vandals from removing the steel plates. The plates also do not provide a flush surface, impeding vehicular traffic and creating a tripping hazard for pedestrians.

Efforts have been made to provide sealed valve box lids. U.S. Pat. No. 4,461,597, teaches a sealable lid using movable "fingers" that extend outward from the underside of the lid to grip the walls of the valve box. This design is not desirable because the structure necessary to support the fingers is relatively complex and extends a significant distance below the lid, which is not suitable for shallow installations, where limited clearance between the top of the valve actuator and the top of the valve box. U.S. Pat. No. 6,887,012 teaches a sealable lid having a lip that rests atop the valve box—providing the convex/domed surface that protrudes above the upper edge of the valve box. This is similarly undesirable because the lid protrudes upwardly from the valve box, creating a bump for anything driving over the valve box.

Accordingly, there is an unmet need for a sealable valve box lid assembly that can provide a water-tight seal between the valve box and ground surface, that is capable of supporting heavy downward loads created by vehicle traffic, and that has a low profile that is suitable for shallow valve box installations.

SUMMARY OF THE INVENTION

The sealable and lockable valve box lid assembly disclosed herein provides a water-tight seal between the valve box and ground surface, is capable of supporting heavy downward loads created by vehicle traffic, and has a low profile that is suitable for shallow valve box installations.

When in a locked position, the valve box lid assembly is adapted to transmit downward loads (such as the load applied when a truck drives over the lid) through the lid assembly and to the valve box ledge. The valve lid is adapted to provide a low-profile design, meaning that the distance between the upper surface of the assembly and the bottom surface of the assembly is minimized. This provides the clearance to enable valve actuators to be located closer to the upper edge of the valve box. The valve box lid assembly is designed to enable the top surface of the assembly to be flush with the upper edge of the valve box when the assembly is installed in the valve box and in a locked position.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
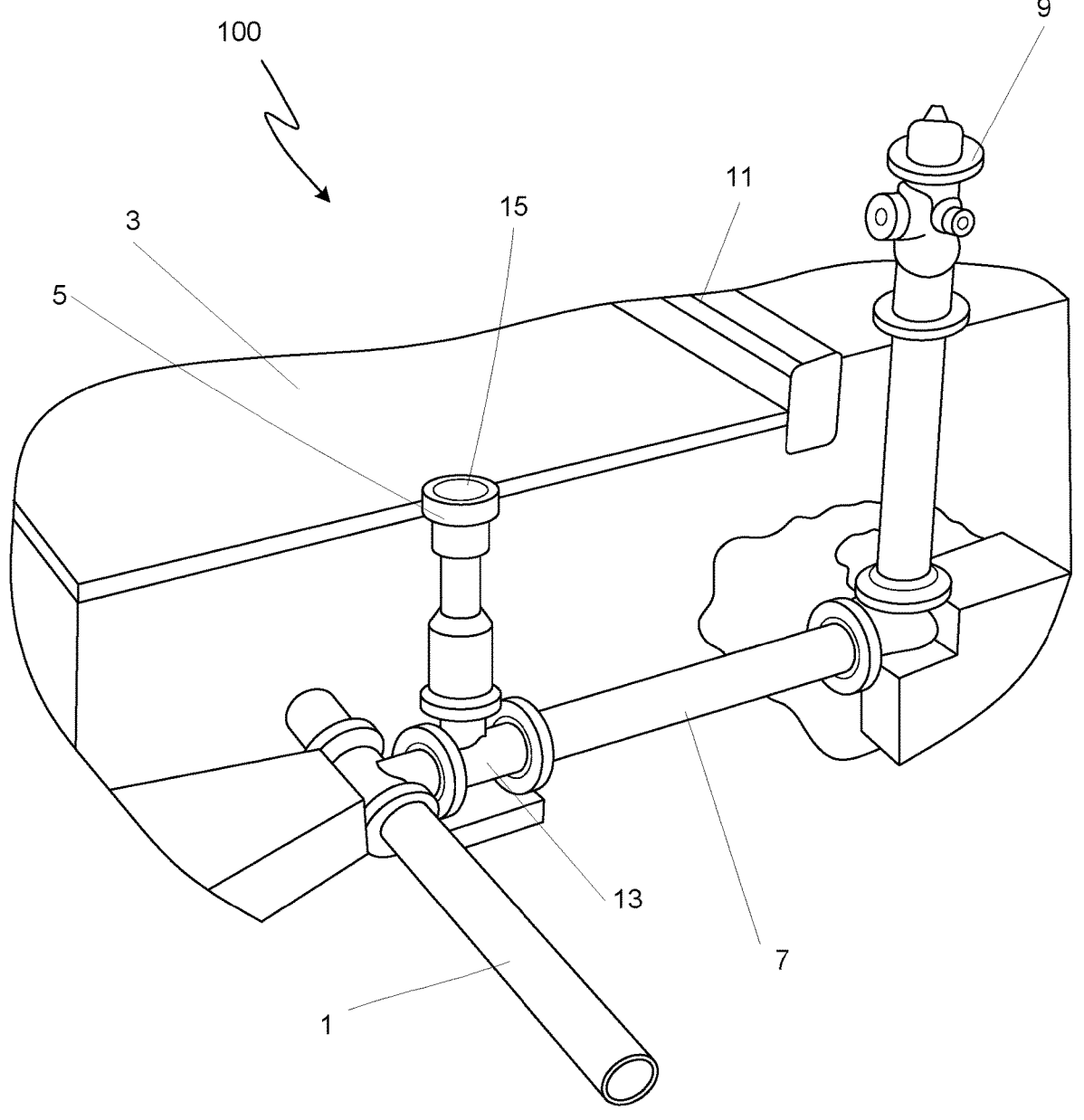
FIG. 1 is a view of a prior art valve box and lid in its use environment.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 2:
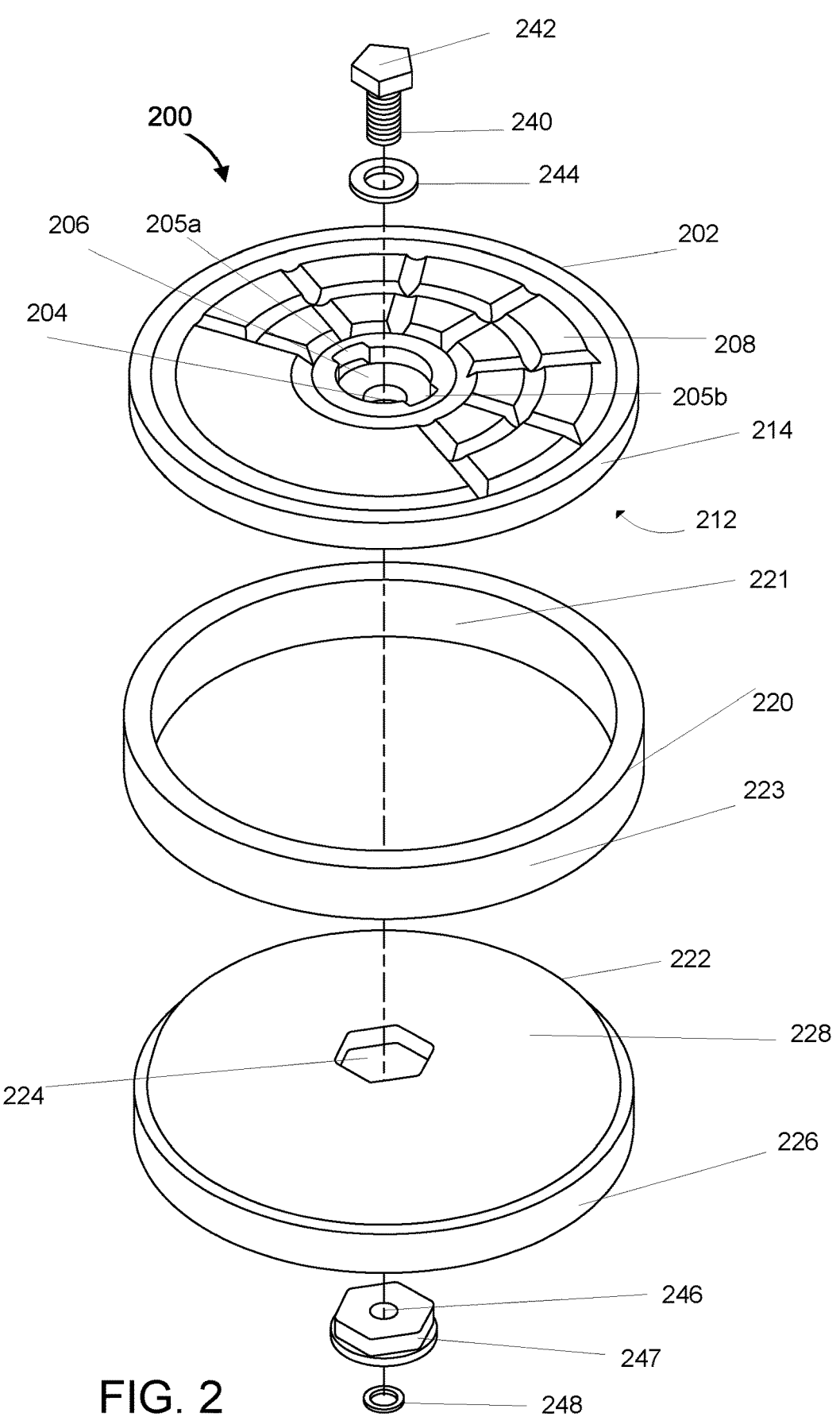
FIG. 2 is an exploded view of an embodiment of the sealing and locking valve box lid of the claimed invention.

FIG. 2 displays an exploded view of an embodiment of the sealing valve box lid assembly. Referring to FIG. 2, the lid assembly 200 comprises an upper plate 202 having a centrally located first aperture 204 extending therethrough. The upper plate 202 further comprises a top surface 208 and upper mating surface 212 that opposes the top surface 208. A centrally located second aperture 206 is between the first aperture 204 and the top surface 208. Recesses 205a, 205b provide a means for the assembly to be removed from its installed location. The second aperture 206 is larger in diameter than the first aperture 204 and the apertures 204, 206 are preferably concentric. The upper plate 202 has an outer edge 214 located along a perimeter of the upper plate 202 and between the top surface 208 and the upper mating surface 212. The upper plate 202 may be formed of any strong, rigid material. A preferred material is ductile iron.

A sealing element 220 is disposed below the upper plate 202 and above a lower plate 222. The sealing element 220 is comprised of an elastomeric material having an annular shape having an inner surface 221 and an outer surface 223. The lower plate 222 is disposed below the first plate 202 and the sealing element 220. The lower plate 222 comprises a lower mating surface 228 and an outer edge 226 disposed along a perimeter of the lower plate 222. The lower plate 222 comprises an aperture 224 that is configured to engage with a threaded fastener 240. The lower plate aperture 224 may itself be threaded (not shown) to engage the threaded fastener. In the embodiment illustrated in FIG. 2, the threaded fastener 240 engages a separate nut 247 having a threaded aperture 246 that sits inside the aperture 224 of the lower plate.

The threaded fastener 240 is adapted to pass through the first aperture 204 and second aperture 206 of the upper plate 202 and engage with a threaded aperture 246 of the lower plate 222. The threaded aperture 246 in the lower plate 222 is preferably formed in a nut 247 that is separable from the lower plate 222. This prevents the fastener 240 from protruding upwardly from the upper plate 202 when the fastener 240 is installed but not fully tightened, which avoids creating a trip hazard or damage caused by a vehicle striking the fastener 240. This design also prevents vertical loads from being transferred through the threads of the fastener 240, particularly when the fastener 240 is in an unlocked/untightened position. The head 242 of threaded fastener 240 has a diameter that is greater than the diameter of the first aperture 204 and less than the diameter of the second aperture 206 so that the head sits inside the recess created by the second aperture. The head 242 may have a tamper-resistant shape (i.e., a shape that is not engageable using standard wrenches or sockets). An upper washer 244 having a rubber layer on one side provides a seal around the fastener 240. A snap ring 248 is preferably included on the lower end of the fastener 240 to prevent the nut from becoming disconnected from the fastener 240.

Referring again to FIG. 2, the lid 200 is assembled by passing the threaded fastener 240 through the apertures 204, 206 of the upper plate 202 to engage the threaded aperture 246 of the lower plate 222. The sealing element 220 is secured between the upper and lower plates 202, 222. The diameter of the annular sealing element 220 is selected so that the inner surface 221 of the sealing element contacts the outer edge 214 of the upper plate and the outer edge 226 of the lower plate. The threaded fastener 240 is thereby operationally configured to draw the upper and lower plates 202, 222 together or apart by rotating the threaded fastener 240 clockwise or counterclockwise, respectively.

Figure 3:
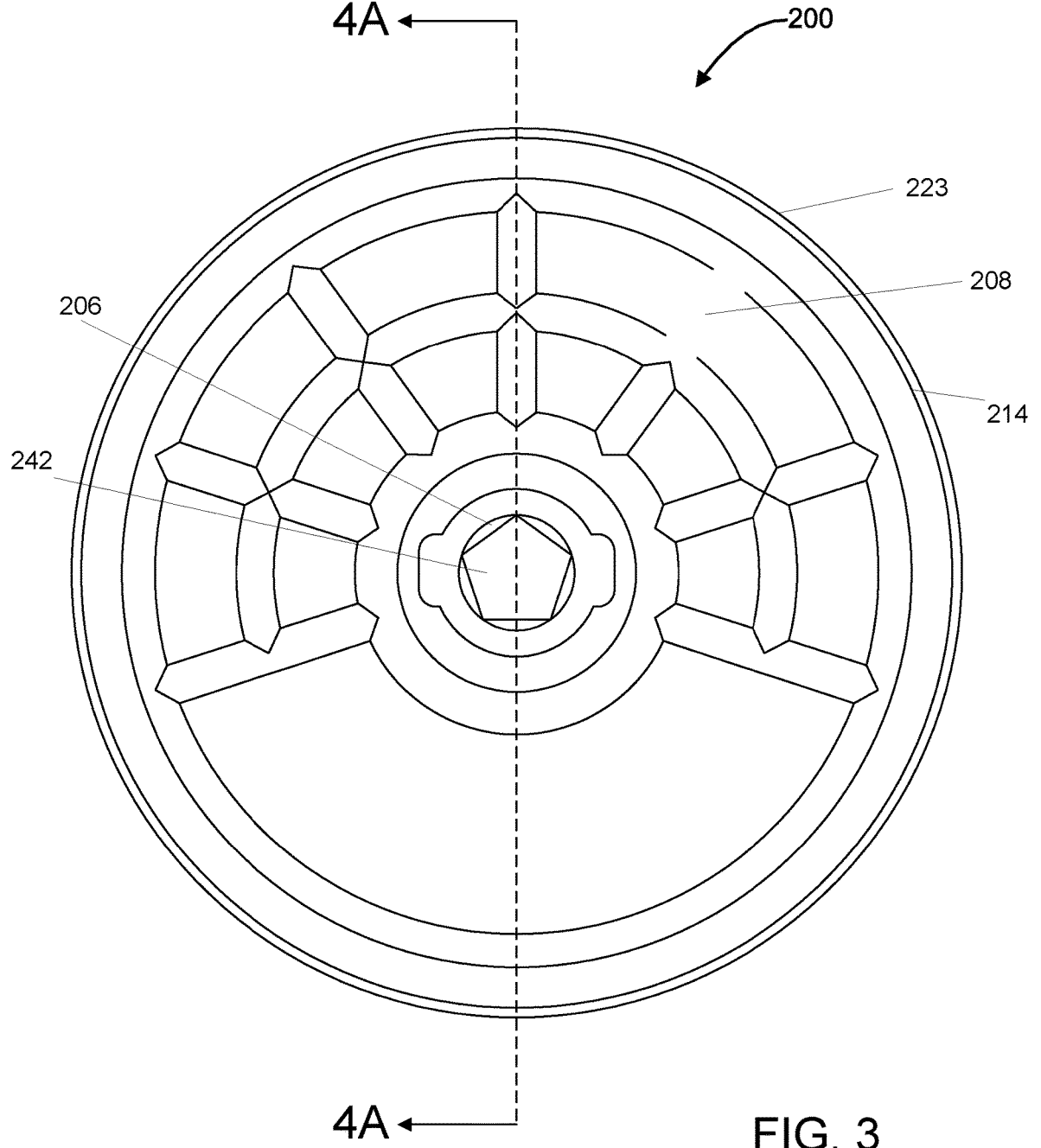
FIG. 3 is a top view thereof.

FIG. 3 is a top view of the sealing valve box lid assembly 200. From this perspective, it is seen that the outer surface 223 of the sealing element extends beyond the outer edge 214 of the upper plate's top surface 208. The head of fastener 240 resides in the recess created by the second aperture 206. The functioning of the sealing valve box lid is described below in reference to a cross-sectional view of the assembly along line 4A-4A.

Figure 4A:
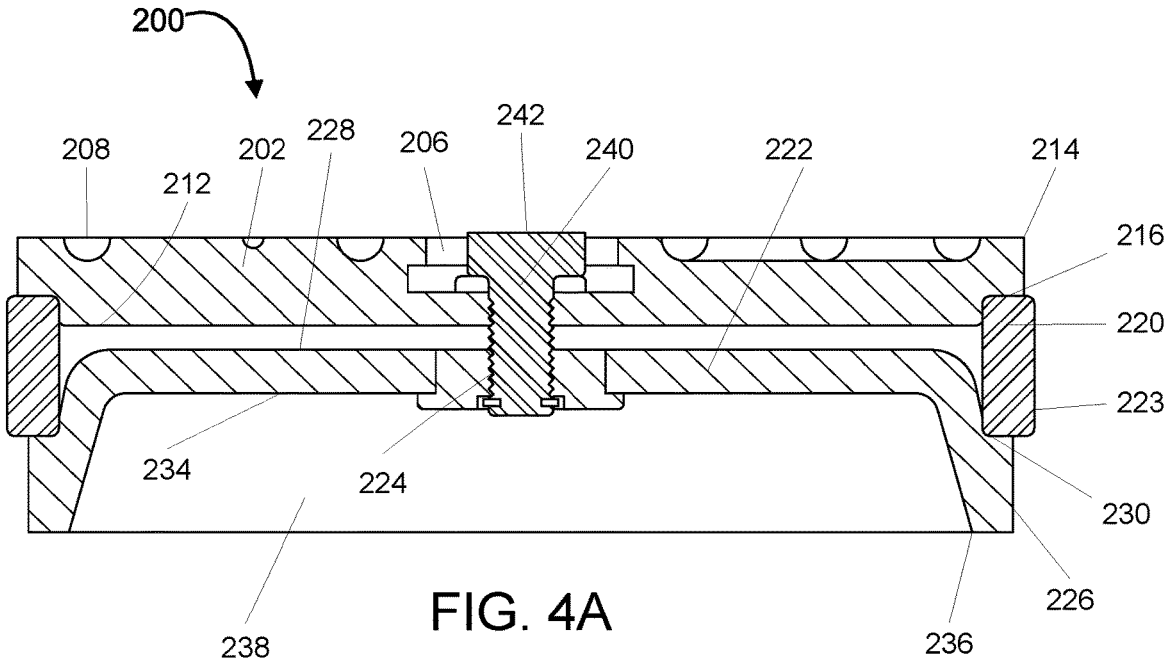
FIG. 4A is a sectional view thereof, taken along line 4A-4A of FIG. 3, showing the valve box lid of in an unlocked position.
Figure 4B:
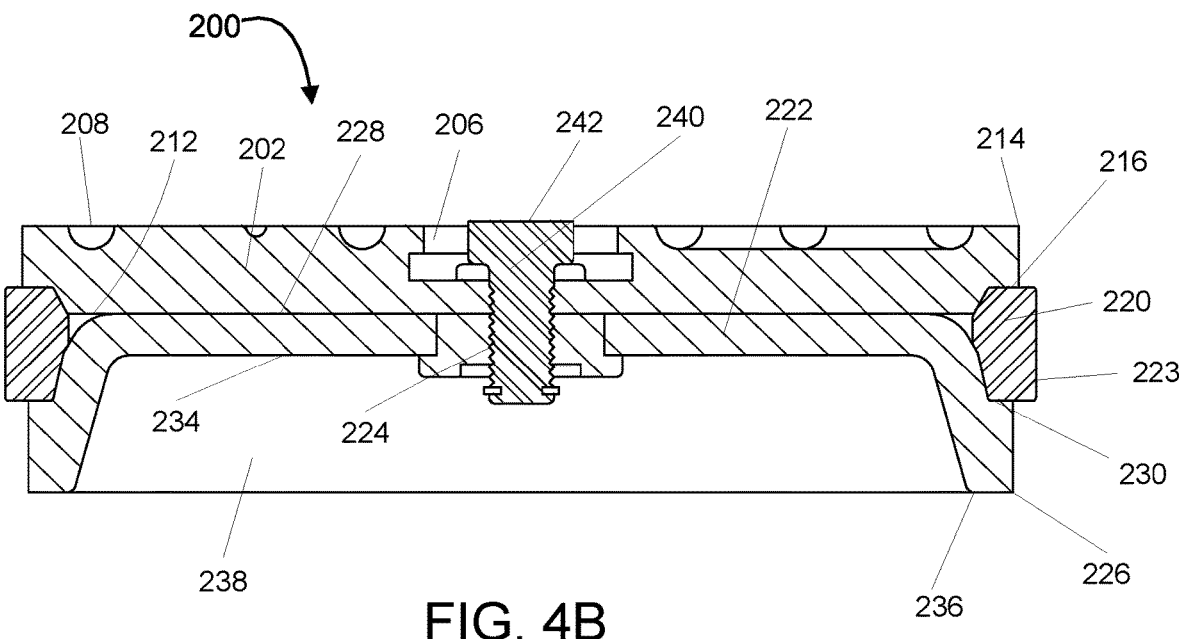
FIG. 4B is a sectional view thereof, taken along line 4A-4A of FIG. 3, showing the valve box lid of in a locked position.

FIGS. 4A and 4B are sectional views, taken along lines 4A-4A of FIG. 3, of the lid assembly 200. FIG. 4A shows the lid assembly 200 in an unsealed position and FIG. 4B shows the lid assembly in a sealed position. The lid assembly 200 is transitioned between the sealed position and unsealed positions by rotating the threaded fastener 240 clockwise or counterclockwise.

Referring to FIG. 4A, in the unsealed position, the upper mating surface 212 of the upper plate 202 is spaced apart from the lower mating surface 228 of the lower plate 222. The outer edge of the upper plate 202 comprises an upper retaining recess 216 which grips the upper portion of the sealing element 220. The outer edge of the lower plate 226 comprises a lower retaining recess 230 which grips the lower portion of the sealing element 220. The outer surface 223 of the sealing element 220 protrudes a first distance beyond the outer edge of the top plate 214 and the outer edge of the lower plate 226.

The lower plate 222 further comprises a lower surface 234 that opposes the lower mating surface 228, and a lower edge 236 that opposes the lower retaining recess 230. The lower edge 236 extends below the lower mating surface 228, thereby defining a lower recess 238 between the lower edge 236 and the lower mating surface 228.

As noted above, one feature of the lid assembly 200 is to provide clearance for shallow installations. To this end, the lower plate 222 has a lower plate thickness (a) extending from the lower mating surface 228 to the lower surface 234 and the lower recess 238 has a lower recess height (b) extending vertically from the lower surface 234 to the lower edge 236, the lower recess height (b) being at least three times the lower plate thickness (a). In another respect, preferably no element in the lower recess 238 extends below the lower edge 236. More preferably the lower-most extending element within the lower recess 238 (in this case, the lower end of the fastener 240) is spaced upwardly from the lower edge 236 a distance (d) that is at least 10% (most preferably at least 20%) of the overall height (c) of the lid assembly 200 when in a sealed/closed position.

In the unsealed position, the head 242 of the threaded fastener 240 is located at least partially within the second aperture 206.

Referring to FIG. 4B, in the sealed position, the upper mating surface 212 of the upper plate 202 is in contact with the lower mating surface 228 of the lower plate 222. Drawing the upper plate 202 and lower plate 222 together also moves the upper retaining recess 216 and lower retaining recess 230 closer together, thereby compressing the elastomeric sealing element 220. As a result of the compression, the outer surface of the sealing element 220 is pushed outward, to protrude a second distance beyond the outer edge of the upper plate 202 and the outer edge of the lower plate 226, where the second distance is greater than the first distance in the unsealed position. When the lid assembly is installed in a valve box, the outward protrusion of the sealing element 220 in the lock position presses the outer surface 223 of the sealing element against the wall of the valve box to create a water-tight seal.

The top edge of the upper retaining recess 216 is located above the upper mating surface 212 and the bottom edge of the lower retaining recess 230 is located below the lower mating surface 232. This enables the gasket to expand outwardly when "pinched" by the gasket-retaining recesses but remain in a seated position when the plate mating surfaces are in contact with one another. In the sealed position, the head 242 of the threaded fastener 240 is preferably flush with the top surface 208 of the top plate 202

Figure 5A:
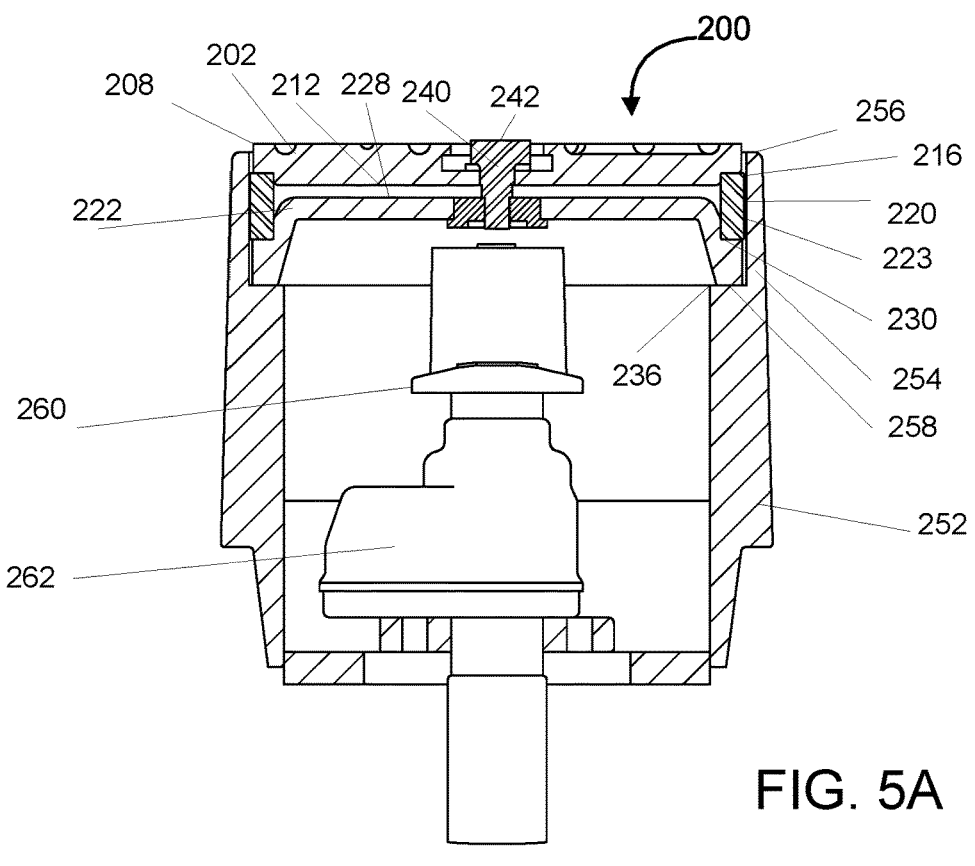
FIG. 5A is a sectional view thereof, taken along line 4A-4A of FIG. 3, showing the valve box lid of in an unlocked position and positioned in a valve box.
Figure 5B:
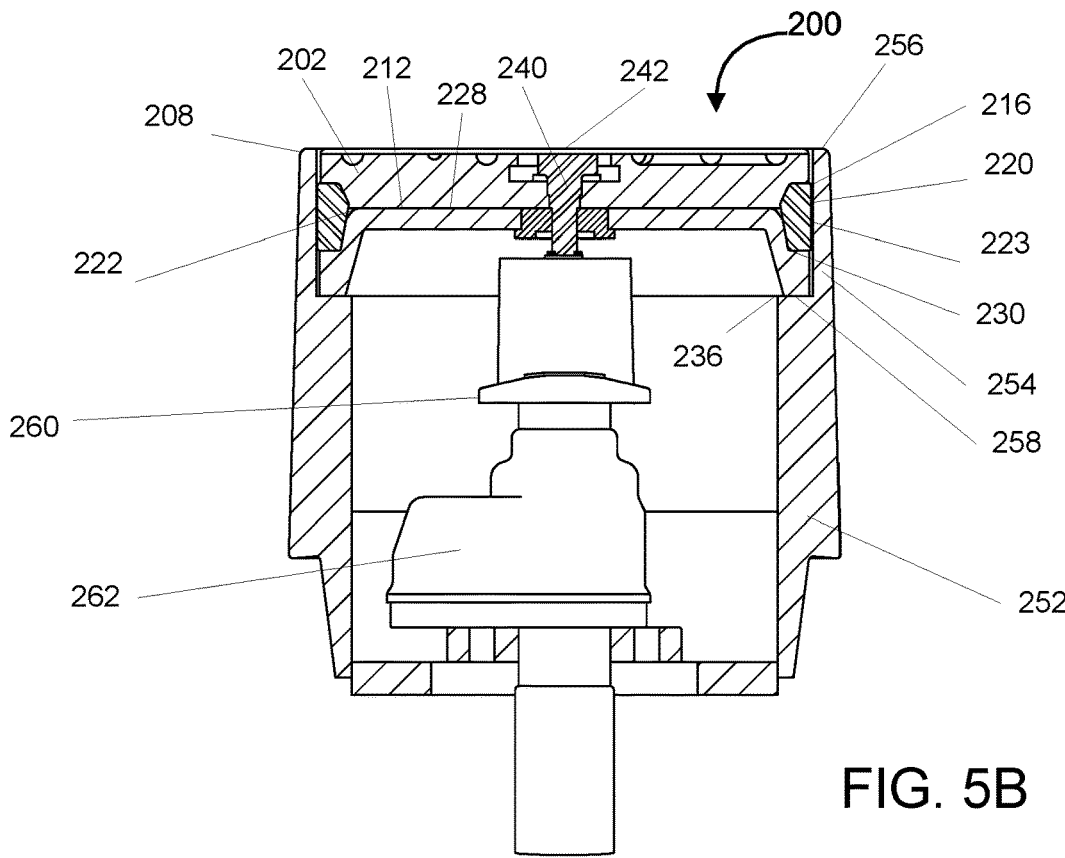
FIG. 5B is a sectional view thereof, taken along line 4A-4A of FIG. 3, showing the valve box lid of in a locked position and positioned in a valve box.

FIGS. 5A and 5B show the sealing valve box lid assembly installed in a valve box. In the interest of clarity, some features that are shared with a previous figure are numbered in FIGS. 5A and 5B, but are not repeated in the specification. FIG. 5A shows the lid in an unsealed position and FIG. 5B shows the lid assembly 200 in a sealed position. The valve box 252 comprises a cylindrical housing having a side wall 254 and a top edge 256 located at the upper edge of the sidewall and defining a circular top aperture. The side wall 254 comprises a ledge 258 located below and distal to the top edge 256 and extending inwardly from the sidewall 254. The valve box 252 surrounds and protects a valve position indicator 262 and a valve actuator 260.

Referring to FIG. 5A, when the lid assembly is installed in the valve box 252, the lower edge 236 of the lower plate 222 rests on the ledge 258 located in the sidewall 254 of the valve box 252. The top surface 208 of upper plate 202 protrudes upwardly from the top edge 256 of the valve box 252 when the lower edge 236 is engaged with the ledge 258 and the lid assembly is in the unsealed position. The outer surface 223 of the sealing element 220 is located opposite the sidewall 254 of the valve box 252.

Referring to FIG. 5B, when the lid assembly 200 is in the locked position, the upper plate 202 and lower plate 222 are drawn together such that the upper mating surface 212 contacts the lower mating surface 228. The upper retaining recess 216 and lower retaining recess 230 compress the elastomeric sealing element 220, causing the outer surface 223 of the sealing element 220 to engage with the side wall 254 of the valve box 252 along the entire outer surface of the sealing element, thereby creating a water-tight seal between the sealing element and the side wall.

When the lid assembly is installed in the valve box and in the sealed position, the top surface 208 and the head of the fastener 240 are both either (a) flush with the top edge 256 of the valve box 252 or (b) located below the top edge 256 of the valve box 252. This creates a flush surface along the entire upper surface of the valve box and lid assembly, such that when the valve box is installed flush with the surrounding pavement or road surface provides a smooth surface for pedestrians and vehicular traffic.

When the lid assembly is installed in the valve box and in the sealed position, downward loads on the top surface 208 of the upper plate 202 are transmitted first to the lower plate 222 via the contacting upper mating surface 212 and lower mating surface 228, and then to the valve box 252 via the lower edge 236 of the lower plate contacting the ledge 258 in the valve box side wall 254. This arrangement allows the lid assembly to support relatively heavy downward loads, such as those created by vehicles and construction equipment driving over the lid assembly.

Unlike existing expandable pipe plugs that are not designed to support downward loads, the upper and lower plates of the disclosed lid assembly have mating surfaces that are configured to contact each other when the valve lid is in a locked position. This enables the sealed assembly to function as a unit to transfer the downward load to valve box ledge.

The shape of the lower plate 222 is designed so that the lid assembly can provided a sealed cover that supports downward loads even in valve boxes where there is low clearance between the valve actuator 260 and the top edge 256 of the valve box. Referring again to FIGS. 4A and 4B, the distance (b) between the lower edge 236 of the lower plate is at least three times the thickness (a) of the lower plate. This creates a lower recess 438 that provides clearance between the lower plate and valve actuator, even in relatively shallow valve box installations.

Figure 6:
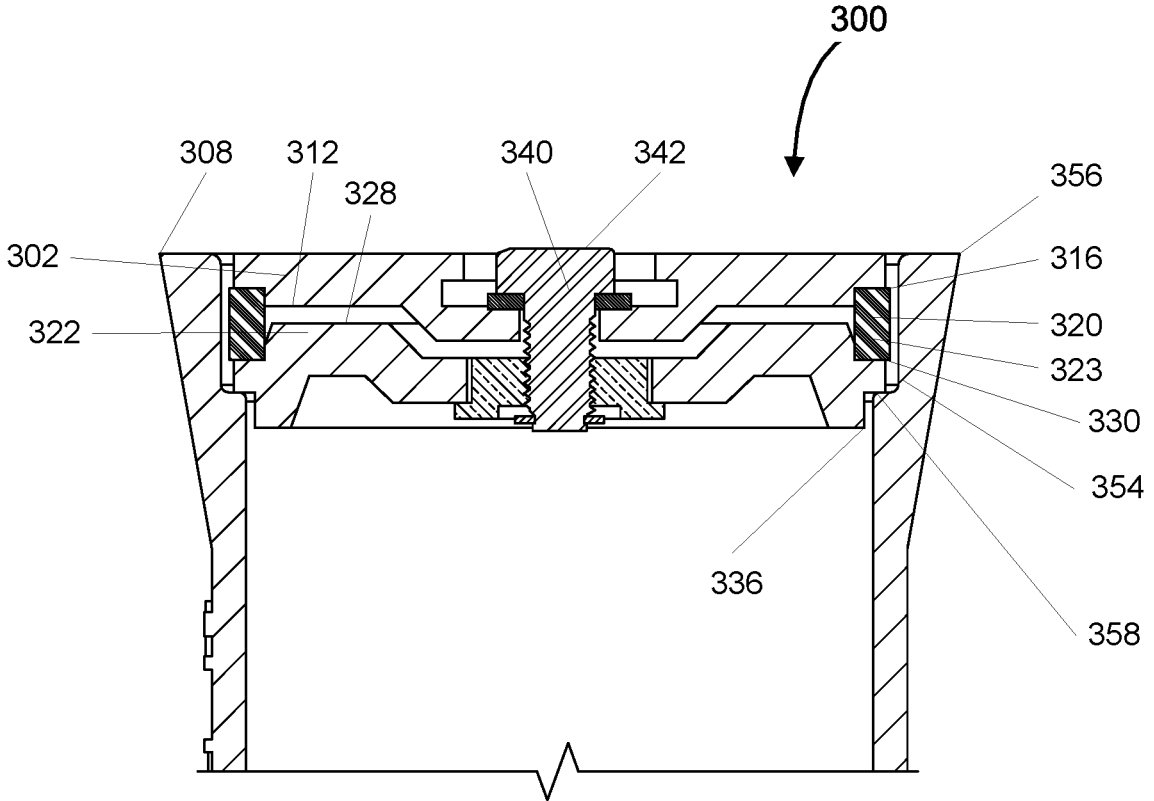
FIG. 6 is a sectional view (taken at the same location of FIG. 5B) showing another exemplary embodiment of the sealing and locking valve box lid in an unlocked configuration and installed on a valve box.

FIG. 6 illustrates an alternate embodiment of the sealing and locking valve box lid. In FIG. 6, elements shared with FIGS. 2 through 5B are represented by reference numerals increased by factors of 100. For example, the sealing element 220 in FIG. 2 corresponds to the sealing element 320 in FIG. 6. In the interest of clarity, some features that are described in connection with a previous figure are numbered in FIG. 6 but are not repeated in the specification.

In FIG. 6, the upper mating surface 312 and the lower mating surface 328 are not planar surfaces, as in the embodiment of FIGS. 4A and 4B, but have complimentary geometries that nevertheless perform the mating function. In addition, the lower edge 336 of lower plate 322 illustrates alternate design for engaging the ledge 358 of the valve box. One of skill in the art will recognize that minor design modifications such as these are possible to accommodate varied valve box geometries while still retaining the functions of the claimed valve box lid assembly.

While the principles of the invention have been described above in connection with preferred embodiments, it is to be clearly understood that this description is made only by way of example and not as a limitation of the scope of the invention.

The invention claimed is:

1. A lid assembly comprising:

a first plate having a first aperture extending therethrough and having a first diameter, a top surface, a first mating surface that opposes the top surface, a first outer edge located along a first perimeter of the first plate and between the top surface and the first mating surface, and a first retaining recess located between the first mating surface and the first outer edge;

a second plate disposed below the first plate, the second plate comprising a second outer edge, a threaded aperture, a second mating surface and a second retaining recess located at an upper end of the second outer edge and between the second mating surface and the second outer edge;

a sealing element formed of a ring of elastomeric material and disposed between the first retaining recess and the second retaining recess; and a fastener disposed in the first aperture and the threaded aperture, the fastener having a threaded body and a head having a head diameter;

wherein the lid assembly has an unsealed position in which the fastener extends through the first aperture and is engaged with the threaded body and the first and second mating surfaces are spaced apart; and wherein the lid assembly has a sealed position in which the first mating surface is in contact with the second mating surface and the sealing element is compressed by the first retaining recess and the second retaining recess, thereby causing the sealing element to protrude outwardly from the first and second outer edges a greater distance than when in the unsealed position.

2. The lid assembly of claim 1, wherein the second plate further comprises a lower edge that is distal to the second retaining recess and is located at a lower end of the second outer edge.

3. The lid assembly of claim 2, wherein the second plate further comprises a lower surface that opposes the second mating surface, the lower edge being located below the lower surface, thereby defining a lower recess between the lower edge and the lower surface.

4. The lid assembly of claim 3, wherein the second plate has a second plate thickness extending from the second mating surface to the lower surface and the lower recess has a lower recess height extending vertically from the lower surface to the lower edge, the lower recess height being at least three times the second plate thickness.

5. The lid assembly of claim 1, wherein the first plate further comprises a second aperture located between the first aperture and the top surface, the second aperture having a second diameter that is larger than the first diameter and the head diameter.

6. The lid assembly of claim 5, wherein the head of the fastener is located at least partially within the second aperture when the lid assembly is in the unsealed position and the sealed position.

7. The lid assembly of claim 1, wherein the threaded aperture comprises part of a nut that is removably inserted into the second plate.

8. A valve box assembly comprising:

a valve box having a side wall, a top edge located at an upper end of the side wall, a ledge located below and distal to the top edge, the ledge extending inwardly from the side wall, the top edge defining a top aperture;

a lid assembly comprising:

a first plate having a first aperture extending therethrough and having a first diameter, a top surface, a first mating surface that opposes the top surface, a first outer edge located along a first perimeter of the first plate and between the top surface and the first mating surface, and a first retaining recess located between the first mating surface and the first outer edge;

a second plate disposed below the first plate, the second plate comprising a threaded aperture, a second mating surface and a second retaining recess disposed along a second perimeter of the second plate;

a sealing element formed of a ring of elastomeric material and disposed between the first retaining recess and the second retaining recess, the sealing element having an outer surface; and a fastener disposed in the first aperture and the threaded aperture, the threaded fastener having a threaded body and a head having a head diameter;

wherein the lid assembly has an unsealed position in which the first and second mating surfaces are spaced apart;

wherein the lid assembly has a sealed position in which the first mating surface is in contact with the second mating surface and the sealing element is compressed by the first plate and the second plate, thereby causing the sealing element to protrude outwardly from the first and second edges a greater distance than when in the unsealed position; and wherein the sealing element engages the side wall along the entire outer surface of the sealing element, thereby creating a water-tight seal between the sealing element and the side wall.

9. The valve box assembly of claim 8, wherein the second plate further comprises a lower edge that opposes the second retaining recess, the lower edge being adapted to engage the ledge when the lid assembly is fully inserted into the valve box.

10. The valve box assembly of claim 9, wherein the lid assembly in the sealed position is adapted to transmit a downward load on the top surface of the upper plate to the valve box ledge via the lower edge.

11. The lid assembly of claim 8, wherein when the second sealing plate has a lower edge that is engaged with the ledge and the lid assembly is in the sealed position, the top surface and the head of the fastener are both either (a) flush with the top edge of the valve box or (b) located below the top edge of the valve box.

12. The lid assembly of claim 11, wherein the second sealing plate includes a lower recess located below and opposing the second mating surface, the lower edge forming a perimeter around a lower end of the lower recess.

13. The lid assembly of claim 11, wherein when the lower edge is engaged with the ledge, the top surface protrudes upwardly from the top edge of the valve box when the lid assembly is in the unsealed position.

14. A lid assembly comprising:

a first plate having a first aperture extending therethrough and having a first diameter, a top surface, a first mating surface that opposes the top surface, a first outer edge located along a first perimeter of the first plate and between the top surface and the first mating surface, and a first retaining recess located between the first mating surface and the first outer edge;

a second plate disposed below the first plate, the second plate comprising a second outer edge, a threaded aperture, a second mating surface and a second retaining recess located at an upper end of the second outer edge and between the second mating surface and the second outer edge;

a sealing element formed of a ring of elastomeric material and disposed between the first retaining recess and the second retaining recess; and a fastener disposed in the first aperture and the threaded aperture, the fastener having a threaded body and a head having a head diameter;

wherein the lid assembly has an unsealed position in which the fastener extends through the first aperture and is engaged with the threaded body, the first and second mating surfaces are separated by a first distance, and the second retaining recess is located below the first mating surface;

wherein the lid assembly has a sealed position in which the first mating surface and the second mating surface are separated by a second distance and the sealing element is compressed by the first retaining recess and the second retaining recess, thereby causing the sealing element to protrude outwardly from the first and second outer edges a greater distance than when in the unsealed position, the second distance being less than the first distance;

wherein the second plate further comprises a lower edge that is distal to the second retaining recess and is located at a lower end of the second outer edge; and wherein the second plate further comprises a lower surface that opposes the second mating surface, the lower edge being located below the lower surface, thereby defining a lower recess between the lower edge and the lower surface.

15. The lid assembly of claim 14, wherein the second plate has a second plate thickness extending from the second mating surface to the lower surface and the lower recess has a lower recess height extending vertically from the lower surface to the lower edge, the lower recess height being at least three times the second plate thickness.

16. The lid assembly of claim 1, wherein the second retaining recess is located below the first mating surface when the lid assembly is in the unsealed position.

17. The lid assembly of claim 1, wherein the second retaining recess is located below the second mating surface.

* * * * *